INVENTOR
Verner F. Davis,
BY
Dyke & Canfield,
ATTORNEYS.

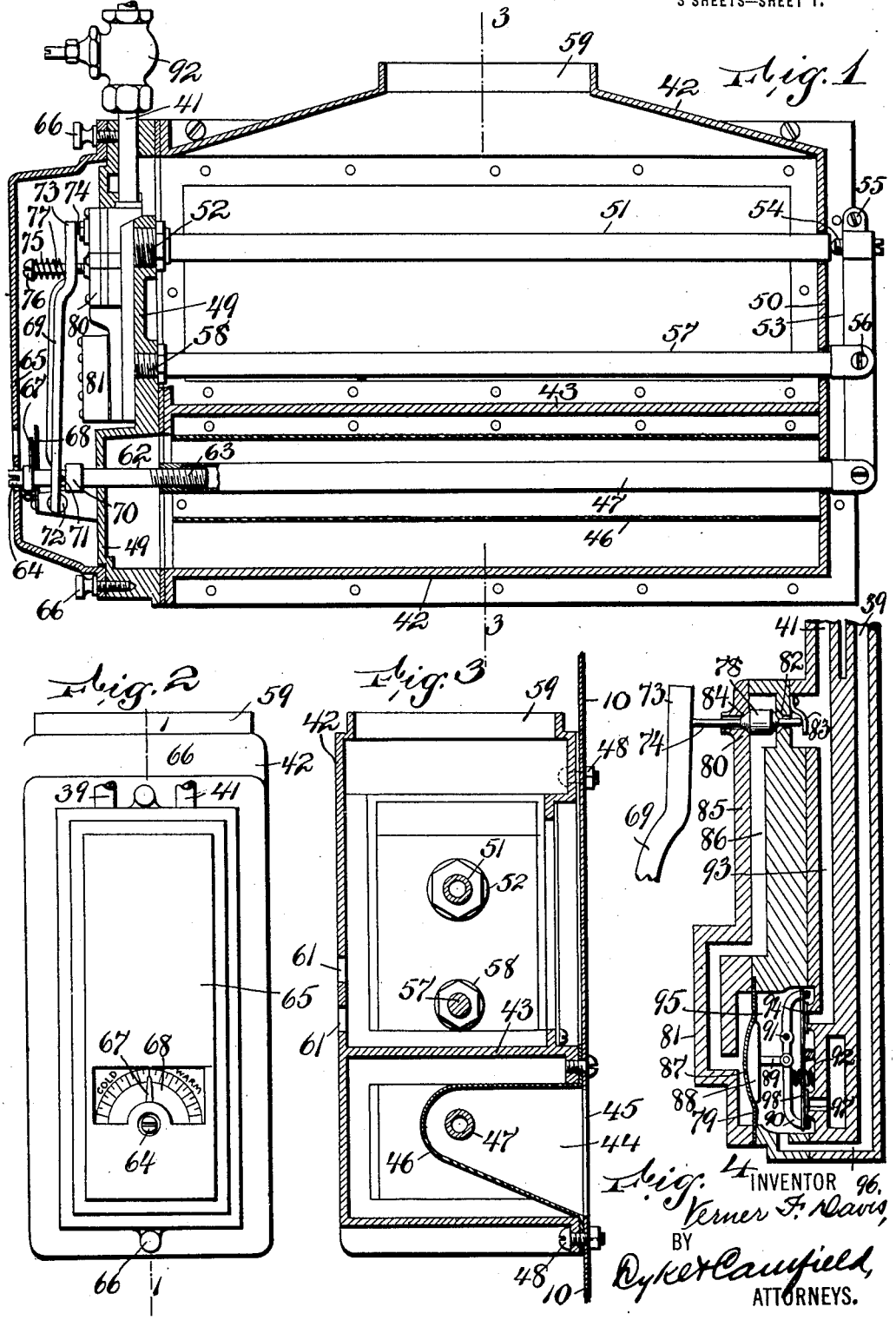

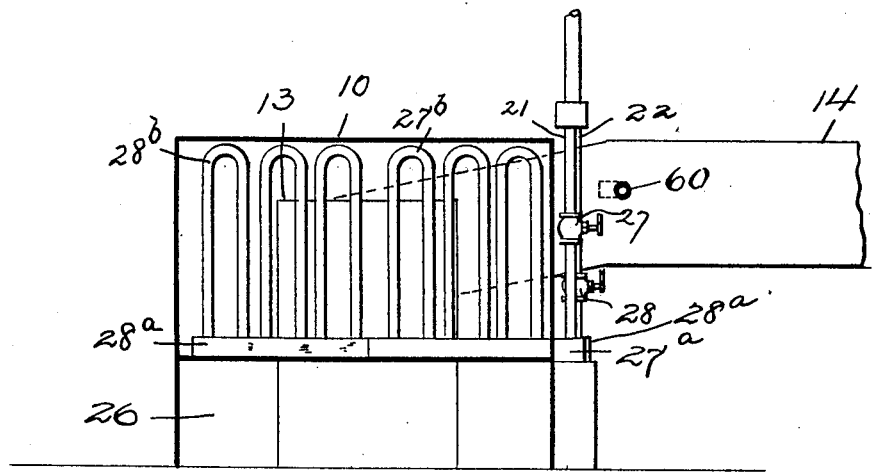

UNITED STATES PATENT OFFICE.

VERNER F. DAVIS, OF ORANGE, NEW JERSEY.

TEMPERATURE-REGULATOR.

1,336,072. Specification of Letters Patent. Patented Apr. 6, 1920.

Application filed November 14, 1917. Serial No. 202,049.

*To all whom it may concern:*

Be it known that I, VERNER F. DAVIS, a citizen of the United States, and a resident of Orange, county of Essex, and State of New Jersey, have invented certain new and useful Improvements in Temperature-Regulators, of which the following is a specification.

This invention relates to an improved thermostat for controlling the temperature of the air heated in a building and supplied to the rooms in said building, the thermostat being constructed so as to be controlled by the outside temperature, that is, the temperature of the atmosphere relative to the temperature being supplied, by the heating medium of the building, to the building.

The invention relates to a thermostat of this kind which has one of its controlling members actuated by the inside temperature, and another member actuated by the outside temperature, so that they coöperate to maintain a desired temperature on the inside of the building.

Another object of the invention is to provide an adjusting device so that the inside temperature of the building can be increased in any ratio to the outside temperature and correspondingly decreased, this adjustment thus permitting an increase of one degree of temperature on the inside of the building to every one degree of decrease of temperature on the outside of the building, or in any other ratio that it is desired to increase the inside temperature as the outside temperature goes down.

The invention is adapted for use with many different systems for heating buildings and can be used particularly in conjunction with any fan blast heating system, and in order to make the invention clear it is illustrated and described as used in conjunction with a fan blast heating system. It will, however, be apparent that this thermostat can be used in different forms of systems and can be changed to meet various constructions of systems and different dispositions of parts of such systems, it being apparent that any one skilled in the art can so attach the device to a system so that it will operate to control such system so long as care is taken that the outside temperature and the inside temperature, the inside temperature being used to identify the temperature supplied by the heating medium of the building to the rooms in the building, are applied to their respective control elements so as to insure a successful operation of the thermostat.

Figure 5:
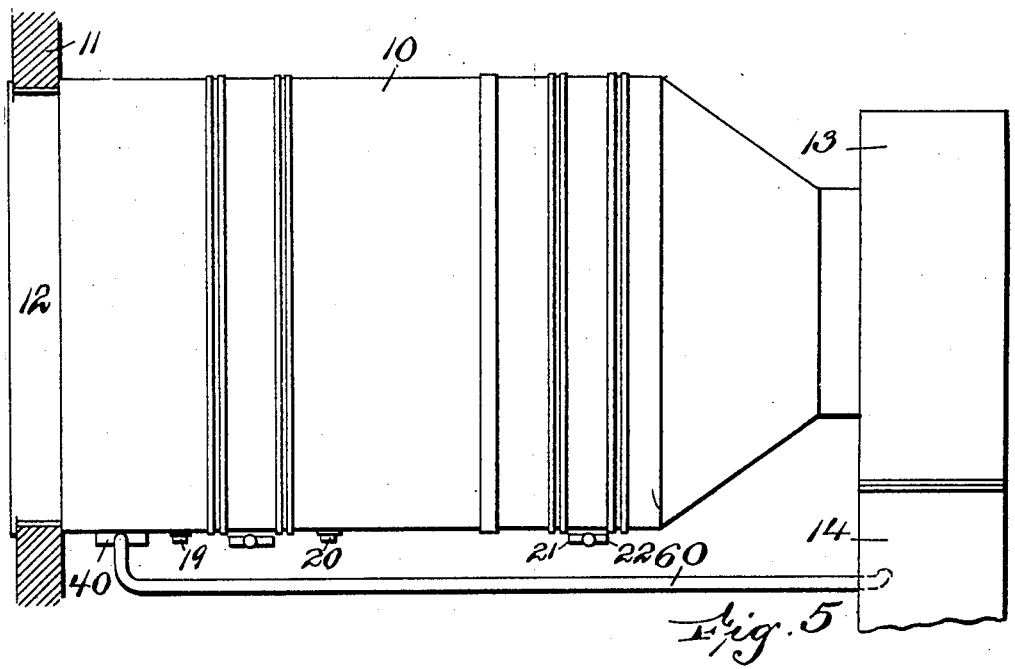
Figure 6:
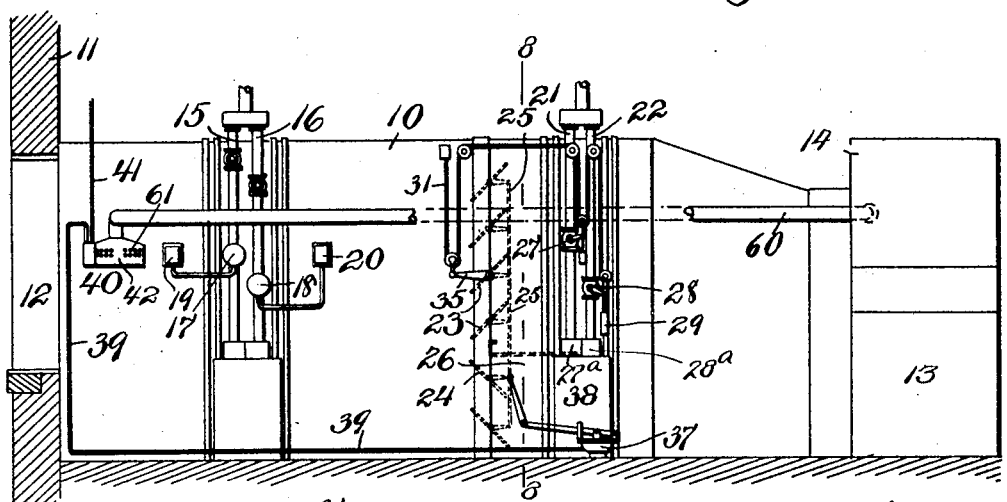
Figure 7:
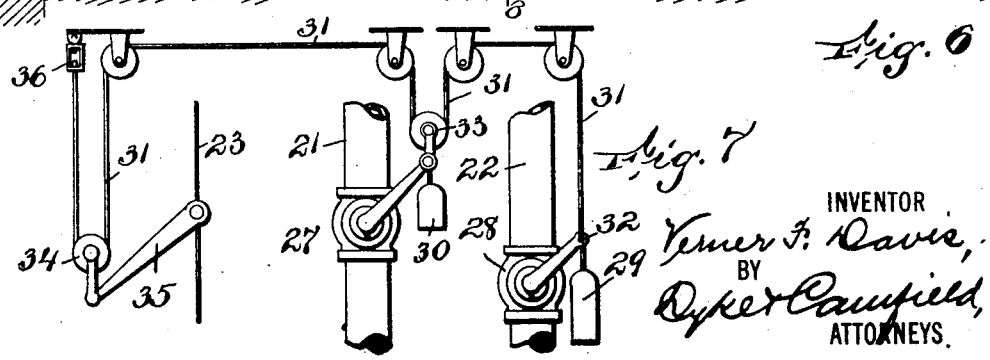

The invention is illustrated in the accompanying drawings, which show one type of thermostat, Figure 1 being a vertical section on line 1—1, in Fig. 2. Fig. 2 is an end view of the thermostat shown in Fig. 1. Fig. 3 is a section on line 3—3, in Fig. 1. Fig. 4 is a section diagrammatically arranged so as to make it clearly understood, this section showing one form of diaphragm controlled valve and illustrating also the thermostatically controlled valve. Fig. 5 is a top view of the inlet and heating part of a fan blast heating system. Fig. 6 is a side view of the structure shown in Fig. 5, Figs. 5 and 6 showing one manner of installing the thermostat in such system, and also illustrating its connection with a control of dampers and heating units, and Fig. 7 is an enlarged view showing the details of the damper and valve controls used in such fan blast system.

Fig. 8 is a section on line 8—8 in Fig. 6.

While it will be evident that this device can be installed in different systems, the system with which it is illustrated is of a fan blast heating type, and it consists of a fresh air intake 10 arranged adjacent to the outer wall 11 of the building, the wall having an opening 12 into which the air passes, the air thus being conducted to a blower or fan 13 with an outlet portion 14 which is connected to the heating units, such as registers or the like, by means of which the rooms are heated. The fresh air intake is provided with heating units, in the form shown the heating units 15 and 16 being simply illustrated as part of the system in this specification and are not controlled by the invention herein described. These are usual installations having diaphragm valves 17 and 18 which are controlled respectively by the cold air thermostat 19 and the temperate air thermostat 20. Additional heating units 21 and 22 are arranged in the fresh air intake and are shown in this illustration in conjunction with main dampers 23 and the by-pass dampers 24 which are operated by a rod 25 so that when the rod is reciprocated, one set of dampers is closed and the other opened. In the form illustrated the rod 25 when moved upward serves to close the main dampers and open the by-pass dampers 24, thus permitting the air to pass through the by-pass 26 and shut it off from passage over the heating units 21 and 22. These heating units are of any desired type. In the drawing I illustrate one form in which the pipes 21 and 22 are connected with the headers 27ª and 28ª, respectively, which in turn are equipped with the tubes or coils 27ᵇ and 28ᵇ, respectively. The admission of heating medium to the units is controlled as desired, but in the form shown they are governed by valves 27 and 28, the valve 28 being actuated by a weight 29 which is heavier than the weight 30. Suitable pulleys are used over which a cable or strand 31 is passed, one end of the cable or strand 31 being fastened to the valve lever 32 of the valve 28 and also being in sliding or rolling connection with a pulley 33 on the valve lever of the valve 27. Said cable or strand 31 also passes over a pulley 34 on the end of a lever 35 connected to one of the dampers 23, the end of the cable being fastened, as at 36, at any convenient point. It will be evident that the valve 28 opens first and closes last, as will be hereinafter more fully described.

So far as described the device is not new and is simply recited to show and to make more plain the operation and functions of the thermostat.

The dampers and heating units in this form are operated by a diaphragm motor 37 which in this application will be called the primary motor, these diaphragm valves or motors being common, being operated in one direction by air under pressure which tends to raise the lever 38 and thus shut off the heating units 21 and 22 and close the dampers 23 and at the same time open the by-pass dampers 24. This lowers the inside temperature, that is, the air passing through the fan is cooler. When the primary motor is vented it may be operated by a spring or by gravity. Weights 29 and 30 may be provided for gravity operation. In the type illustrated the primary motor 37 is supplied with air by a pipe 39 which is connected to the thermostat 40, the thermostat controlling the admission of air to the pipe 39, and being in turn supplied through a pipe 41 which is connected to a suitable source of air supply, such source not being illustrated but being of any kind adapted to supply enough pressure.

The thermostat comprises a casing or shell 42 which is divided by a partition 43 into two chambers. One of the chambers has an opening 44 therein which is placed against an opening 45 in the side wall of the intake 10. A shield 46 in the chamber serves further to insure that the cold thermostatic member 47 is protected from any influence except that of the cold air coming into the intake 10. The casing 42 is fastened tightly against the intake 10 by suitable bolts or screws 48. The casing 42 has end walls 49 and 50 to further insure the confining of influencing temperatures to their respective elements. In the other or second chamber of the casing is a hot thermostatic member 51 which is fastened to the wall 49, as at 52, and projects through the wall 50. The cold thermostatic member 47 also projects through the wall 50, these members being adapted to operate on a lever 53, the lever in the form shown being pivoted to the member 47 and having a screw 54 which abuts on the end of the member 51, the screw being placed in the end of the lever which is split and has a binding screw 55 to insure the security of the screw 54. The lever is hinged intermediate of its ends, as at 56, to a non-expanding member 57. This non-expanding member is fastened as at 58 to the wall 49.

The chamber in which the hot thermostatic member is located has an opening 59 which is connected by a pipe 60 (Figs. 5 and 6) to a passage through which the air heated by the heating units is passed to the rooms of the building or to any suitable point from which it will receive air heated by the heating units. In the drawing it is illustrated as receiving air from the fan duct 14. The hot air thus fed to the hot thermostatic member passes out through openings 61 in the casing 42.

The cold thermostatic member is provided with an extension 62 which is preferably adjustably connected to the end of the member 37, such adjustable connection being usually furnished by a screw-threaded end 63 on the extension 62, which end is in screw-threaded engagement with the end of the member, and thus when the extension is turned by its projecting end it is extended or retracted, as will be understood. In the form shown the end 64 is slotted so that it can be turned by a screw-driver, although other means of turning it can be employed, this end projecting slightly through the end of the face plate 65 which protects the device from dust and like interference and is fastened in place as by the screws 66. A suitable index 67 registering on a plate 68 can be employed to indicate the position of the extension. The extension is adapted to bear against the lever 69 to operate said lever in one direction, this being accomplished in the drawings by a collar 70 on the extension which bears against the knife edges 71 on the lever, the lever being pivoted at 72 and extending upward with its upper end 73 being pressed in engagement with the stem 74 of the primary valve, to be hereinafter described, by a suitable spring 75 which bears at one end on the end of the lever and is in engagement with the head 76 of the screw 77, such screw being arranged so that it passes through an opening in the lever, and being screwed into the body portion of the thermostat it controls the tension of the spring by being turned to the right or left.

The primary valve 78 is thus controlled by the primary lever 69 and in turn it controls the admission of air under pressure to the primary motor by controlling the intermediate relay 79. The primary valve 78 and the relay 79 are arranged in the casings 80 and 81 respectively, but they are illustrated in detail in Fig. 4 and shown in a diagrammatic way to clearly illustrate the channels for air and the manner and mechanism in and by which they are controlled and the flow of air directed and regulated. The stem 74 of the valve 78 also extends to the rear of the valve through a port 82 and is normally forced against the primary lever 69 by yielding means, such as a spring 83, the primary valve 78 being also adapted to be seated, by the pressure of said spring 83, into a port 84 in the wall 85, both the port 82 and the port 84, however, being large enough to loosely receive the stem 74, thus permitting the venting through these ports when the valve is removed from either of the ports. The channel 86 is in communication, through the port 82, with the pipe 41 and leads to the rear of the intermediate relay, in the form shown this being a secondary motor in the form of a diaphragm 87 bearing on the head 88 which in turn has a stem 89 hinged to a rocking lever 90 which is pivoted at 91 and is normally pressed outward by suitable yielding means, such as a spring 92. The channel 93 is closed at its end by a secondary valve 94, this valve, when open, permitting communication to the chamber 95 in which the diaphragm is located, the chamber 95 being in connection, by means of a passage 96, with the pipe 39. The chamber 95 is vented by a venting valve 97, the secondary valve 94 and the venting valve 97 being arranged on a spring strip 98, and the ends of the lever 90 extend beyond the ends of this spring plate so that both the valve 94 and the valve 97 can be shut, and when the lever 90 rocks in one direction or the other, it can open one of the valves without disturbing the other. It will be evident that other means of operating this secondary valve and the relay valve can be devised without departing from the scope of the invention. As illustrated in Fig. 1, the air valves can be supplied with suitable valves 92 by means of which the air can be shut off when necessary, as in the case of repairs.

The operation of the device is as follows. Assuming that the device is used in conjunction with the type of intake and blower illustrated in the drawing, and with the thermostat mounted so that its cold member is under the influence of the air coming in from the outside, which I will call the outside temperature, the device is regulated as to the temperature at which it is desired that the outdoor and the fan temperatures are to meet. If this is to be say sixty degrees Fahrenheit, and if the indoor or fan temperature is to gain one degree for every degree the outdoor temperature drops, the extension 62 is adjusted so that the primary lever 69 is moved outward so that the primary valve 78 is open, that is, it uncovers the port 82. This permits air under pressure from the pipe 41 to pass through the channel 86 and force the diaphragm 87 so that the lever 90 is rocked to open the secondary inlet valve 94. This admits air under pressure from the pipe 41 and channel 93 into the chamber 95 and then through the passage 96 and the pipe 39 to the primary motor 37. This operation of the primary motor closes the main dampers 23, opens the by-pass dampers 24 and closes the control valves of the heating units 21 and 22.

As the outdoor temperature drops below sixty degrees, the cold thermostatic member contracts and in contracting it permits the spring 75 to push the primary lever 69 against the stem 74 of the primary valve 78 and the primary valve 78 is forced shut to close the port 82 and to open the port 84. This vents the channel 86 and the chamber behind the diaphragm 87, and the spring 92 presses the lever 90 so that the secondary valve 94 is closed and the vent valve 97 is opened. This vents the channel 96 and the pipe 39 and also the primary motor 37, which thus operates to close the by-pass dampers 24, open the main dampers 23, and also open the control valves of the heating units 21 and 22. The heaters are then in operation to increase the temperature of the air passing through the fan casings. The air leaving the fan is therefore of a higher temperature and also passes through the pipe 60 into the chamber in which the hot thermostatic member 51 is located. The hot thermostatic member 51 is thus subjected to this higher temperature and it expands, and in expanding it operates on the upper end of the lever 53, pushing it outward and pushing the lower end in, and since the lower end is fastened to the cold thermostatic member 47, this member is pushed, along with its extension 62, so that it presses outward on the primary lever 69, overcomes the pressure of the spring 75 and permits a movement of the primary valve 78 from its closed position to its open position. The diaphragm is again operated as above described, the vent valve 97 is closed, the secondary valve 94 is opened, and air under pressure is admitted through the channel 96 and the pipe 39 to the primary motor 37, and the heating units are partially or entirely cut out, the main dampers are partially or entirely closed, and the by-pass dampers are partially or entirely opened, according to the extended movement of the primary valve 78.

Taking it for granted, for instance, that a change of four degrees on either of the thermostatic members 47 or 51 is necessary for a full movement of the primary valve 78, any movement within that range will cause the valve to take an intermediate position so that the ports 82 and 84 are both partly opened, which will balance the pneumatic pressure on the diaphragm, since the admission and venting of air is the same, and the damper motor has its pneumatic pressure balanced and will operate the controlling medium in an intermediate manner so that the heat is entirely turned on or entirely turned off only on temperature changes exceeding two degrees above or below the operating temperature.

In the form shown the cold thermostatic member and the hot thermostatic member are shown of the same length, they are made of metal easily influenced by temperature changes, and they are shown also as being arranged equal distances from the fulcrum or supporting member 57, and being of the same coefficient of expansion, they will cause a rise of one degree on the inside temperature for a dropping of one degree on the outside temperature, but these ratios can be changed by varying the lengths of the respective expanding members or by varying the leverage between them. The extension 62 is preferably made of non-expanding material so that the expansive length of the cold thermostatic member 47 is not affected by the regulation of the extension 62.

Having thus described my invention, I claim:

1. The combination with the heating system of a building, which heating system comprises an air intake and means for heating the air on its way to the rooms, of a thermostat having a member subject to the temperature of the air in the system before passing the heating unit, a second member subject to the influence of the temperature of the air after the air has passed the heating unit, said members being made of a substance easily influenced by temperature changes and located substantially close together, and a mechanism including a lever operated and controlled by said members, said mechanism regulating the admission of heat to the heating unit.

2. The combination with a heating system, said heating system comprising an air passage and a heating unit in the air passage, of a thermostat having a cold thermostatic member and also having a hot thermostatic member, said thermostatic members being located substantially close together, and a mechanism acted on directly by both members, said mechanism controlling the admission of heat to the heating unit.

3. The combination of a heating system, a thermostat located in the cold air passage and having a cold thermostatic member influenced by air before it is heated and having a hot thermostatic member located adjacent to the cold thermostatic member and adapted to be influenced by air after it is heated, means for conducting heated air to said hot thermostatic member, and thermostatically operated means actuated directly by said members in the same direction under similar temperature changes, the second mechanism regulating the admission of heat to the heating unit.

4. The combination of a heating system of a building comprising an air passage having a heating unit therein, a primary motor controlling the admission of heat to the heating unit, with a thermostat having a cold thermostatic member subject to the influence of the air before it passes the heating unit, the thermostat having a hot thermostatic member located substantially adjacent to the cold thermostatic member and influenced by the air after it has passed the heating unit, means for conducting heated air to the hot thermostatic member, pipes conducting air under pressure to the primary motor, and a valve operated from said members and regulating the flow of air under pressure to and from the primary motor.

5. A thermostat having a casing and two chambers, a thermostatic member in one chamber which is adapted to be influenced by warm air, a thermostatic member in the other chamber, the second member being adapted to be influenced by cold air, valved passages in the thermostat for conducting air under pressure, and an operative connection between the thermostatic members and the valved passages for controlling the passage of air under pressure through the passages.

6. A thermostat having a casing with a partition dividing the casing into chambers, a thermostatic member in one chamber, the chamber having passages for the entrance and escape of hot air, a thermostatic member in the other chamber, the chamber having an opening for the entrance of cold air, means in the thermostat for controlling the passage of air under pressure, and an operative connection between the thermostatic members and the controlling means.

7. A thermostat having a casing divided into chambers, one chamber having openings for the passage of hot air, the other chamber having an opening for cold air, a thermostatic member in each chamber, a lever with which the thermostatic members are in operative connection, the thermostat having valved passages for the passage of air under pressure, and a connection between one of the thermostatic members and the valved passages for controlling the passage of air through said passages.

In testimony that I claim the foregoing I hereto set my hand this 13th day of November, 1917.

VERNER F. DAVIS.